(12) United States Patent
Mehr et al.

(10) Patent No.: US 7,505,248 B2
(45) Date of Patent: Mar. 17, 2009

(54) CONTROLLED-RESISTANCE CAPACITORS, AND METHODS OF ASSEMBLING SAME

(75) Inventors: Behrooz Z. Mehr, Santa Clara, CA (US); Juan P. Soto, Chandler, AZ (US); Nicholas Holmberg, Gilbert, AZ (US); Kevin M. Lenio, Fullerton, CA (US); Larry E. Mosley, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 196 days.

(21) Appl. No.: 11/173,877

(22) Filed: Jun. 30, 2005

(65) Prior Publication Data

US 2007/0002520 A1    Jan. 4, 2007

(51) Int. Cl.
*H01G 2/20*    (2006.01)
(52) U.S. Cl. ............ 361/308.1; 361/306.1; 361/306.3; 361/321.1; 361/321.2; 361/303
(58) Field of Classification Search ............ 361/306.1, 361/306.3, 302–305, 308.1, 321.1, 321.2, 361/321.4, 311–313
See application file for complete search history.

(56) References Cited

U.S. PATENT DOCUMENTS

| | | | | |
|---|---|---|---|---|
| 6,795,294 | B2 * | 9/2004 | Kuroda et al. | 361/306.1 |
| 6,819,543 | B2 * | 11/2004 | Vieweg et al. | 361/306.3 |
| 6,972,942 | B2 * | 12/2005 | Ritter et al. | 361/306.3 |
| 7,149,071 | B2 * | 12/2006 | Mosley | 361/306.3 |
| 7,215,530 | B2 * | 5/2007 | Li et al. | 361/303 |

OTHER PUBLICATIONS

Mosley, L., "Controlled Resistance Capacitors", U.S. Appl. No. 11/083,636, filed Mar. 16, 2005.

* cited by examiner

*Primary Examiner*—Nguyen T Ha
(74) *Attorney, Agent, or Firm*—John N. Greaves on behalf of Intel Corporation

(57) ABSTRACT

A parallel-plate capacitor structure includes a capacitor electrode including a first resistance and an electrode tab appended to the capacitor electrode and including a second resistance. The second equivalent series resistance is greater than the first equivalent series resistance. A process of assembling a parallel-plate capacitor package is also disclosed. A computing system is also disclosed that includes the parallel-plate capacitor package.

22 Claims, 5 Drawing Sheets

CONTROLLED-RESISTANCE CAPACITORS, AND METHODS OF ASSEMBLING SAME

TECHNICAL FIELD

Disclosed embodiments relate to a plate capacitor assembly.

BACKGROUND INFORMATION

An integrated circuit (IC) die often requires capacitative power sources to respond to transient loads generated during operation. Capacitors are provided to answer the transient load requirements of the IC die. Operation of capacitors, such as parallel-plate capacitors, can generate inductive events that can affect signal flow to and from the IC die.

BRIEF DESCRIPTION OF THE DRAWINGS

In order to understand the manner in which embodiments are obtained, a more particular description of various embodiments briefly described above will be rendered by reference to the appended drawings. Understanding that these drawings depict only typical embodiments that are not necessarily drawn to scale and are not therefore to be considered to be limiting of its scope, some embodiments will be described and explained with additional specificity and detail through the use of the accompanying drawings in which.

DETAILED DESCRIPTION

The following description includes terms, such as upper, lower, first, second, etc., that are used for descriptive purposes only and are not to be construed as limiting. The embodiments of a device or article described herein can be manufactured, used, or shipped in a number of positions and orientations. The terms "die" and "processor" generally refer to the physical object that is the basic workpiece that is transformed by various process operations into the desired integrated circuit device. A die is usually singulated from a wafer, and wafers may be made of semiconducting, non-semiconducting, or combinations of semiconducting and non-semiconducting materials. A board is typically a resin-impregnated fiberglass structure that acts as a mounting substrate for the die.

Reference will now be made to the drawings wherein like structures will be provided with like reference designations. In order to show the structure and process embodiments most clearly, the drawings included herein are diagrammatic representations of embodiments. Thus, the actual appearance of the fabricated structures, for example in a photomicrograph, may appear different while still incorporating the essential structures of embodiments. Moreover, the drawings show only the structures necessary to understand the embodiments. Additional structures known in the art have not been included to maintain the clarity of the drawings.

Figure 1:
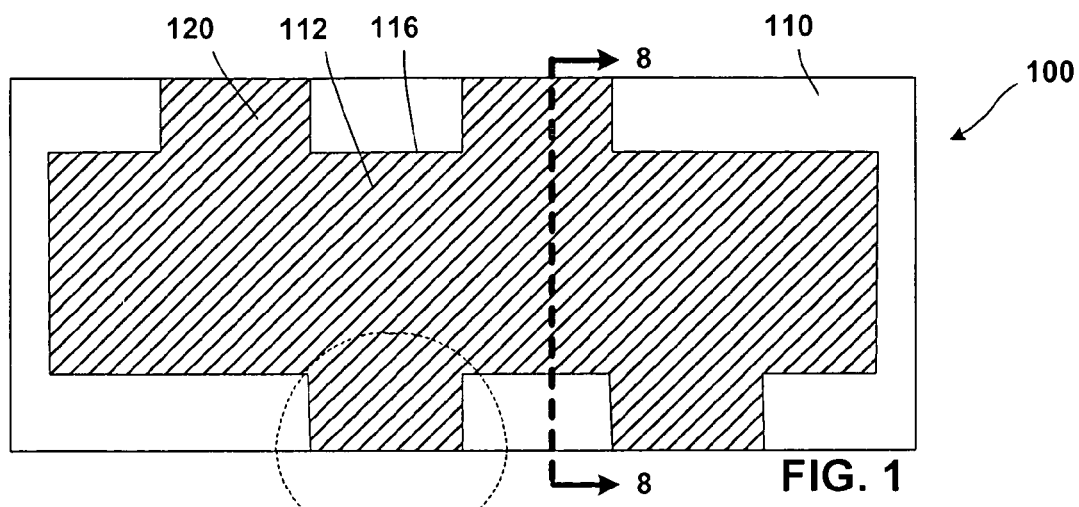
FIG. 1 is a plan of a capacitor layer assembly according to an embodiment.

FIG. 1 is a plan of a capacitor layer assembly 100 according to an embodiment. The capacitor layer assembly 100 includes a capacitor dielectric substrate 110 that is a ceramic according to an embodiment. In an embodiment, the dielectric substrate 110 includes a strontium titanate (ST) ceramic material. In an embodiment, the dielectric substrate 110 includes a barium-strontium titanate (BST) ceramic material.

The capacitor layer assembly 100 also includes a capacitor electrode 112. The capacitor electrode 112 is identifiable by a characteristic first resistance. A plurality of four electrode tabs is depicted, one of which is designated with the reference numeral 120. The electrode tab 120 is likewise identifiable by a characteristic second resistance. The electrode tab 120 contacts the capacitor electrode 112 at a terminal edge 116 thereof. In an embodiment, the metals of the capacitor electrode 112 and the electrode tab 120 are an integral metal.

In an embodiment, the capacitor layer assembly 100 includes more than four electrode tabs. In an embodiment, the capacitor layer assembly 100 includes only exposed, whole-edge terminals as is known in the art. In any event, the capacitor electrode structure includes a resistance that is lower than the resistance of the electrode tab(s). Accordingly, the equivalent series resistance (ESR) of the structure is higher than the situation where the resistance of the plate and terminal were the same. In any event, the aggregate resistance is impacted by the geometry of the electrodes 112 and electrode tab(s) 120.

In an embodiment, the capacitor electrode 112 is a metal selected from nickel, palladium, platinum, and the like and the electrode tab 120 is selected from a material with a higher resistance than the capacitor electrode 112. In an embodiment, the capacitor electrode 112 is a metal selected from copper, silver, gold, and the like, and the electrode tab 120 is selected from a material with a higher resistance than the capacitor electrode 112. In an embodiment, the capacitor electrode 112 is a metal selected from aluminum, aluminum-copper, aluminum-silver, aluminum-copper-silver, and the like, and the electrode tab 120 is selected from a material with a higher resistance than the capacitor electrode 112.

Figure 2A:
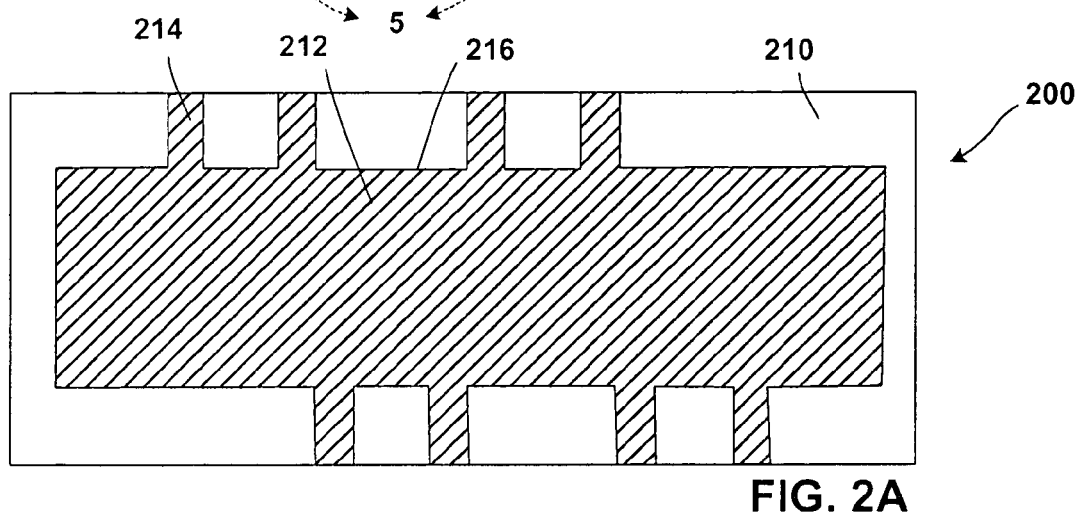
FIG. 2A is a plan of a capacitor layer assembly during processing according to an embodiment.

FIG. 2A is a plan of a capacitor layer assembly 200 during processing according to an embodiment. The capacitor layer assembly 200 includes a capacitor dielectric substrate 210 that is a ceramic according to an embodiment. The capacitor layer assembly 200 also includes a capacitor electrode 212.

Processing includes first screen printing the capacitor electrode 212 and an electrode tab first portion as depicted in FIG. 2A. The electrode tab first portion is depicted in eight occurrences, one of which is designated with the reference numeral 214. The electrode tab first portion 214 contacts the capacitor electrode 212 at a terminal edge 216 thereof. By "screen printing" it is meant that the printing of the capacitor electrode 212 and the electrode tab first portion is done according to known technique such as using a mask. In an embodiment, actual screen printing is used with a mesh screen, such that the capacitor electrode 212 and the electrode tab first portion 214 are formed in a single printing action.

Figure 2B:
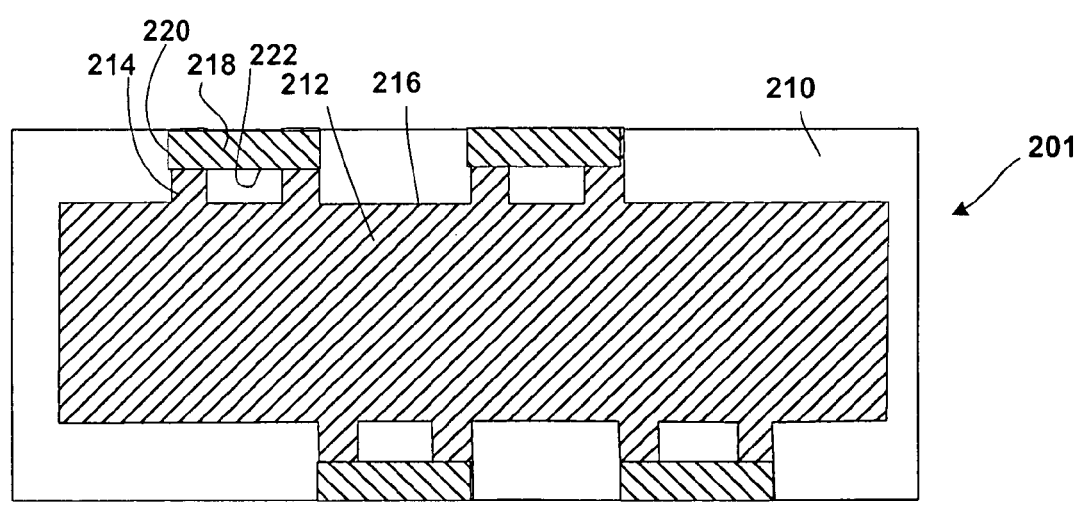
FIG. 2B is a plan of the capacitor layer assembly depicted in FIG. 2A after further processing.

FIG. 2B is a plan of the capacitor layer assembly 200 depicted in FIG. 2A after further processing. The capacitor layer assembly 201 exhibits a terminal second portion 218 in four occurrences. A given terminal second portion 218 connects a given occurrence of the electrode tab first portion 214. A plurality of four electrode tabs 220 is depicted, one of which is designated with the reference numeral 220.

After assembly as depicted in FIG. 2B, the capacitor electrode 212 is identifiable by a characteristic first resistance, and the electrode tab 220 is identifiable by a characteristic second resistance that is larger than the characteristic first resistance. The characteristic second resistance that is larger than the characteristic first resistance is achieved by the presence of an opening 222 in the electrode tab 220. In this embodiment, the opening 222 penetrates through the capacitor layer.

In an embodiment, the capacitor layer assembly 201 includes more than four electrode tabs 220. In any event, the capacitor electrode structure includes a resistance that is lower than the resistance of the electrode tab(s).

In an embodiment, the opening 222, although it is depicted in FIG. 2 as being substantially rectilinear, is curvilinear. In an embodiment, the opening 222 is a combination of rectilinear and curvilinear when observed in plan view.

Figure 3:
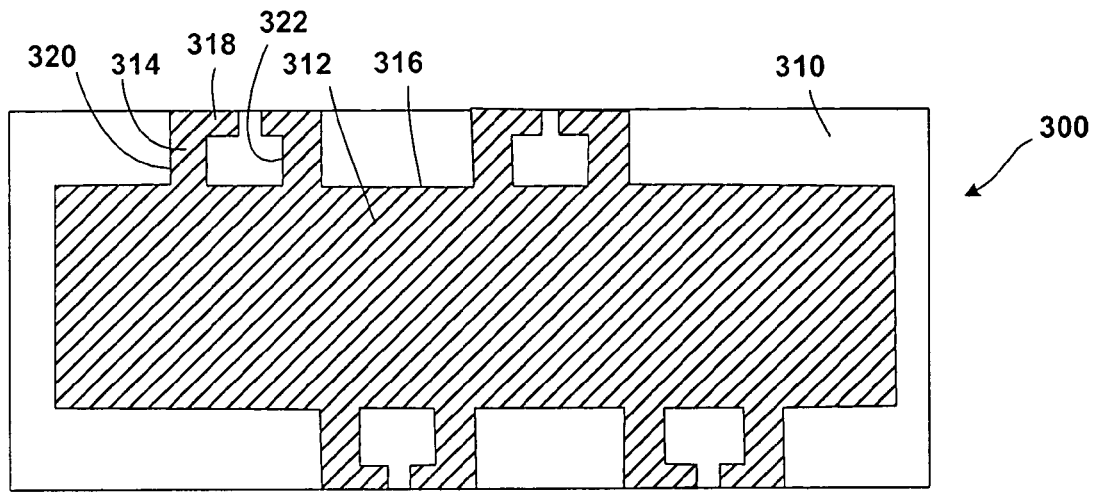
FIG. 3 is a plan of a capacitor layer assembly according to an embodiment.

FIG. 3 is a plan of a capacitor layer assembly 300 according to an embodiment. The capacitor layer assembly 300 includes a capacitor dielectric substrate 310 that is a ceramic according to an embodiment. The capacitor layer assembly 300 also includes a capacitor electrode 312. A plurality of four electrode tabs is depicted, one of which is designated with the reference numeral 320. The electrode tab 320 includes an electrode tab first portion 314, which contacts the capacitor electrode 312 at the terminal edge 316 thereof. The electrode tab first portion 314 is depicted in eight occurrences, one of which is labeled. The electrode tab 320 also includes an electrode tab second portion 318, which leaves a channel opening 322 in the electrode tab 310.

After assembly as depicted in FIG. 3, the capacitor electrode 312 is identifiable by a characteristic first resistance, and the electrode tab 320 is identifiable by a characteristic second resistance that is larger than the characteristic first resistance. The characteristic second resistance that is larger than the characteristic first resistance is achieved by the presence of a channel opening 322 in the electrode tab 320. The channel opening 322 is defined as an open-ended opening in the electrode tab 320.

In an embodiment, the channel opening 322, although it is depicted in FIG. 3 as being substantially rectilinear, is curvilinear. In an embodiment, the channel opening 322 is a combination of rectilinear and curvilinear when observed in plan view.

Figure 4:
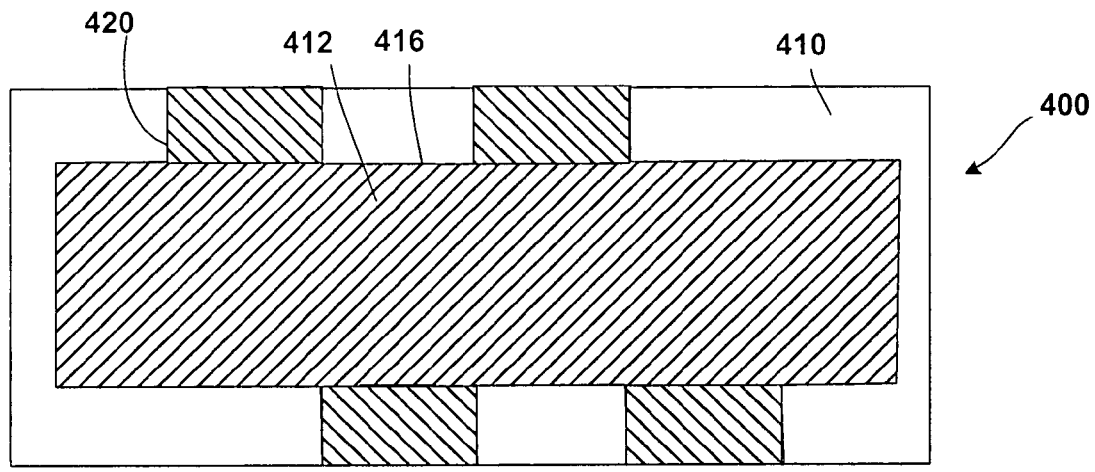
FIG. 4 is a plan of a capacitor layer assembly according to an embodiment.

FIG. 4 is a plan of a capacitor layer assembly 400 according to an embodiment. The capacitor layer assembly 400 includes a capacitor dielectric substrate 410 that is a ceramic according to an embodiment. The capacitor layer assembly 400 also includes a capacitor electrode 412. An electrode tab is depicted in four occurrences, one of which is designated with the reference numeral 420. The electrode tab 420 contacts the capacitor electrode 412 at a terminal edge 416 thereof.

FIG. 4 depicts the result of separately screen printing the capacitor electrode 412 and the electrode tab 420. In an embodiment, printing of the capacitor electrode 412 precedes printing of the electrode tab 420. In an embodiment, printing of the electrode tab 420 precedes printing of the capacitor electrode 412.

After assembly as depicted in FIG. 4, the capacitor electrode 412 is identifiable by a characteristic first resistance, and the electrode tab 420 is identifiable by a characteristic second resistance that is larger than the characteristic first resistance. In an embodiment, the characteristic second,resistance that is larger than the characteristic first resistance is achieved by a difference of metals. In an embodiment, the metal of the capacitor electrode 412 is a better electrical conductor than the metal of the electrode tab 420.

Although a plurality of four electrode tabs 420 is depicted, the capacitor layer assembly 400 can include more than four electrode tabs 420. In any event, the capacitor electrode structure includes a resistance that is lower than the resistance of the electrode tab(s).

Figure 5:
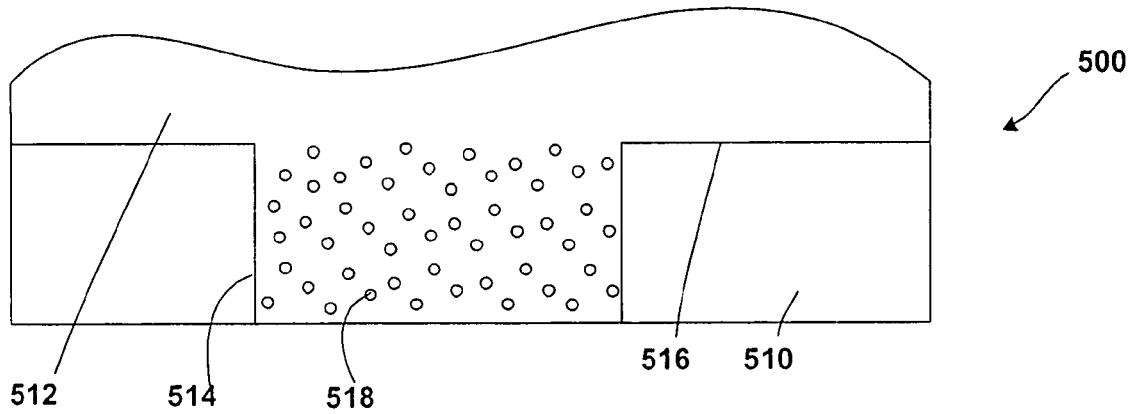
FIG. 5 is plan detail of an electrode tab appended to the capacitor electrode depicted in FIG. 1 according to an embodiment.

FIG. 5 is plan detail of an electrode tab assembly 500 appended to the capacitor electrode depicted in FIG. 1 according to an embodiment. The detail is taken along the line 5 depicted in FIG. 1. The electrode tab assembly 500 includes a capacitor dielectric substrate 510 that is a ceramic according to an embodiment. The electrode tab assembly 500 also includes a capacitor electrode 512 and an electrode tab 520. In an embodiment, the electrode tab 520 contacts the capacitor electrode 512 at a terminal edge 516 thereof.

In an embodiment, the electrode tab 520 includes the electrode tab metal portion 514 and an electrode tab dielectric particle portion 518, which leaves an opening in the electrode tab metal portion 514. In an embodiment, the dielectric particle portion 518 is a particulate that amounts to a virtual opening in the electrode tab 520.

In an embodiment, the electrode tab dielectric portion 518 includes a plurality of dielectric particles 518 such that the electrode tab 520 includes a substantially homogeneous dispersion of dielectric particles 510 therein. In an embodiment, the electrode tab dielectric portion 518 amounts to a virtual void or a virtual void pattern in the electrode tab metal portion 514.

After assembly as depicted in FIG. 5, the capacitor electrode 512 is identifiable by a characteristic first resistance, and the electrode tab 520 is identifiable by a characteristic second resistance that is larger than the characteristic first resistance. The characteristic second resistance that is larger than the characteristic first resistance is achieved by the presence of the electrode tab dielectric portion 518 disposed in the electrode tab 520.

Figure 6:
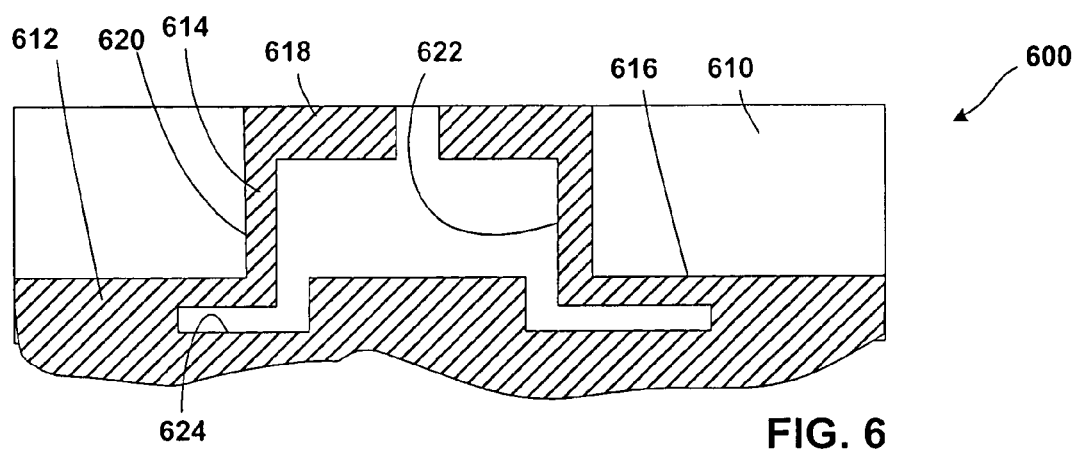
FIG. 6 is plan detail of an electrode tab assembly according to an embodiment.

FIG. 6 is plan detail of an electrode tab assembly 600 according to an embodiment. The electrode tab assembly 600 includes a capacitor dielectric substrate 610 that is a ceramic according to an embodiment. The capacitor layer assembly 600 also includes a capacitor electrode 612. A plurality of electrode tabs are also present, one of which is designated by reference numeral 620. In an embodiment, the electrode tab 620 includes an electrode tab first portion 614, which contacts the capacitor electrode 612 at a plate terminal edge 616 thereof. An electrode tab second portion 618 is also present. Additionally a channel opening 622 is present in the in the electrode tab 620. In an embodiment, the electrode tab 620 includes an undercut 624 in the terminal edge 616 of the capacitor electrode 612.

Because of the composite shape of the electrode tab first portion 614 and the electrode tab second portion 618, the shape thereof creates a non-linear current flow path from the electrode tab 620 to the capacitor electrode 612 or vice versa, and a characteristic inductive force is generated due to the current path. Similarly, because the undercut 624 in the terminal edge 616 of the capacitor electrode 612 creates a nonlinear current flow path from the electrode tab 620 to the capacitor electrode 612, a characteristic inductive force is generated due the to current path. In an embodiment, the characteristic inductive force of a solid-metal electrode tab can be offset by forming at least one of an undercut, e.g., 624 or a composite electrode tab 614 and 618.

After assembly as depicted in FIG. 6, the capacitor electrode 612 is identifiable by a characteristic first resistance, and the electrode tab 620 is identifiable by a characteristic second resistance that is larger than the characteristic first resistance. The characteristic second resistance that is larger than the characteristic first resistance by the presence of the cross-sectional current area in the electrode tab 620. Similarly, the characteristic inductance generated by current flow is affected by the shape of the channel opening 622 as well as by the undercut 624 in the capacitor electrode 612, which affects the current flow path.

Figure 7:
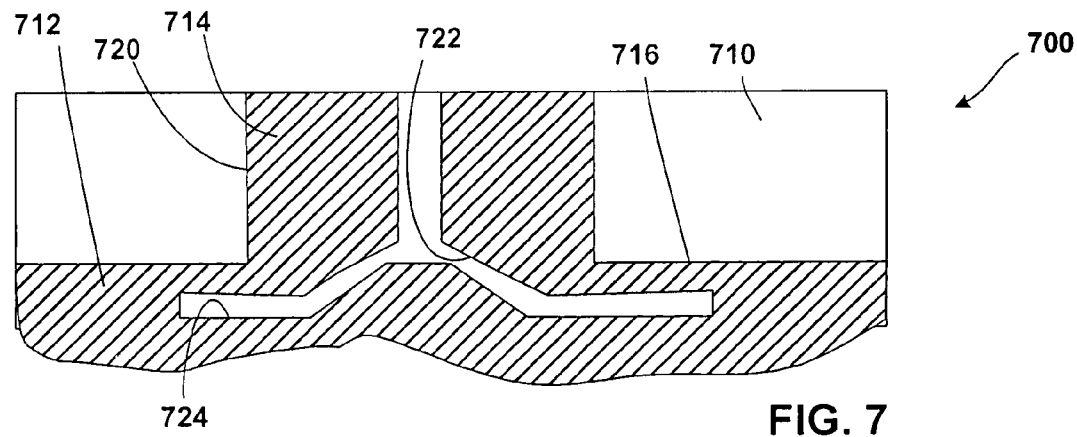
FIG. 7 is plan detail of an electrode tab assembly according to an embodiment.

FIG. 7 is plan detail of an electrode tab assembly 700 according to an embodiment. The electrode tab assembly 700 includes a capacitor dielectric substrate 710 that is a ceramic according to an embodiment. The electrode tab assembly 700 also includes a capacitor electrode 712 and an electrode tab 720. In an embodiment, the electrode tab 720 includes an electrode tab first portion 714, which contacts the capacitor electrode 712 at a plate terminal edge 716 thereof.

In an embodiment, the electrode tab 720 includes a diagonal channel opening 722 therein. In an embodiment, the electrode tab 720 includes an undercut 724 in the terminal edge 716 of the capacitor electrode 712. Because the undercut 724 in the terminal edge 716 of the capacitor electrode 712 creates a nonlinear current flow path from the electrode tab 720 to the capacitor electrode 712, a characteristic inductive force is generated due the to current path.

After assembly as depicted in FIG. 7, the capacitor electrode 712 is identifiable by a characteristic first resistance, and the electrode tab 720 is identifiable by a characteristic second resistance that is larger than the characteristic first resistance. The characteristic second resistance that is larger than the characteristic first resistance is achieved by the presence of the shape and current flow through the electrode tab 720. Similarly, the characteristic inductance generated by current flow is affected by the shape of the diagonal channel opening 722 as well as by the undercut 724 in the capacitor electrode 712, which affects the current flow path.

Figure 8:
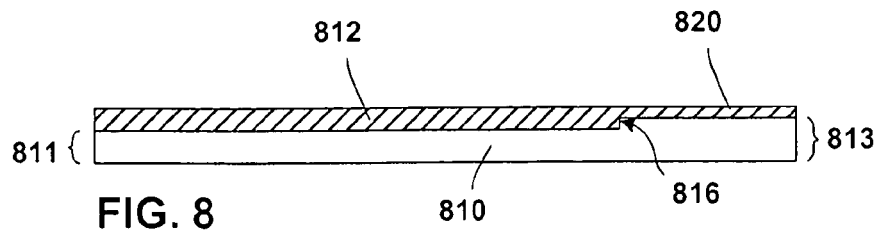
FIG. 8 is a cross section of a capacitor layer assembly according to an embodiment.

FIG. 8 is a cross section of a capacitor layer assembly 800 according to an embodiment. The capacitor layer assembly 800 includes a capacitor dielectric substrate 810 that is a ceramic according to an embodiment.

The capacitor layer assembly 800 also includes a capacitor electrode 812. The capacitor electrode 812 is identifiable by a characteristic first resistance. An electrode tab 820 is also depicted. The electrode tab 820 is likewise identifiable by a characteristic second resistance. The electrode tab 820 contacts the capacitor electrode 812 at a terminal edge 816 thereof. In an embodiment, the metals of the capacitor electrode 812 and the electrode tab 820 are an integral metal. In an embodiment, the metals of the capacitor electrode 812 and the electrode tab 820 are different metals. In an embodiment, the metals of the capacitor electrode 812 and the electrode tab 820 are different metals, and the metal of the capacitor electrode 812 is a better electrical conductor than the metal of the electrode tab 820.

The dielectric substrate 810 includes a plate-support portion 811 and an electrode-tab support portion 813, which is thicker than the plate-support portion 811. Accordingly, the electrode tab 820 is thinner than the capacitor electrode 812.

In an embodiment, the capacitor layer assembly 800 includes only exposed, whole-edge terminals 820. In any event, the capacitor electrode structure includes a resistance that is lower than the resistance of the electrode tab(s).

Figure 9:
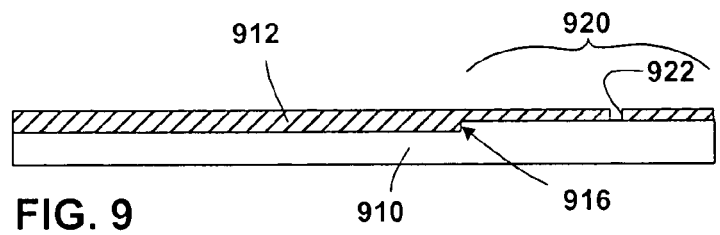
FIG. 9 is a cross section of a capacitor layer assembly according to an embodiment.

FIG. 9 is a cross section of a capacitor layer assembly 900 according to an embodiment. The capacitor layer assembly 900 includes a capacitor dielectric substrate 910 that is a ceramic according to an embodiment.

The capacitor layer assembly 900 also includes a capacitor electrode 912. The capacitor electrode 912 is identifiable by a characteristic first resistance. An electrode tab 920 is also depicted. The electrode tab 920 is likewise identifiable by a characteristic second resistance. The electrode tab 920 in FIG. 9 is depicted in cross-section as being interrupted by at least one opening 922.

The electrode tab 920 contacts the capacitor electrode 912 at a terminal edge 916 thereof. In an embodiment, the metals of the capacitor electrode 912 and the electrode tab 920 are an integral metal. In an embodiment, the metals of the capacitor electrode 912 and the electrode tab 920 are different metals. In an embodiment, the metals of the capacitor electrode 912 and the electrode tab 920 are different metals, and the metal of the capacitor electrode 912 is a better electrical conductor than the metal of the electrode tab 920.

The dielectric substrate 910 includes a plate-support portion 911 and an electrode-tab support portion 913, which is thicker than the plate-support portion 911. Accordingly, the electrode tab 920 is thinner than the capacitor electrode 912.

In an embodiment, the capacitor layer assembly 900 includes only exposed, whole-edge terminals 920. In any event, the capacitor electrode structure includes a resistance that is lower than the resistance of the electrode tab(s).

Figure 10:
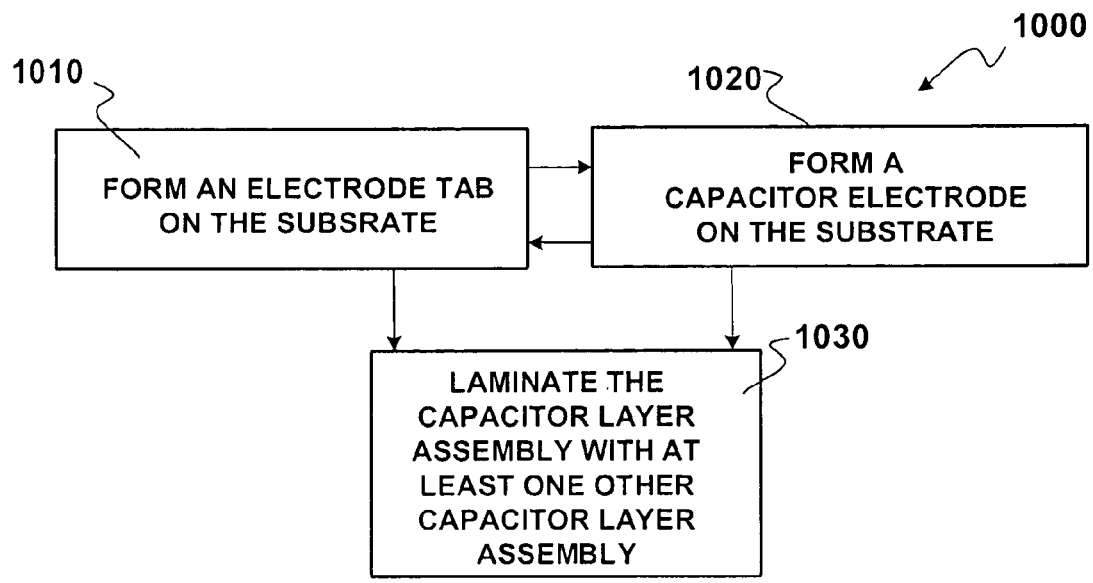
FIG. 10 is a process flow diagram according to various embodiments.

FIG. 10 is a process flow diagram 1000 according to various embodiments.

At 1010, the process includes forming an electrode tab. By way of non-limiting example, the electrode tab 420 depicted in FIG. 4 is first formed by a screen printing process such as by screen printing a metal paste onto the dielectric substrate 410. P At 1020, the process includes forming a capacitor electrode. By way of non-limiting example, the capacitor electrode 412 is formed by a screen printing process. In an embodiment, the processes 1010 and 1020 are carried out simultaneously. By way of non-limiting example, the electrode tab 120 and the capacitor electrode 112 depicted in FIG. 1 are simultaneously screen printed from a metal paste.

At 1030, the process includes laminating the capacitor layer assembly with at least one other capacitor layer assembly. This process includes laminating several capacitor layer assemblies to form an interleaved, parallel-plate capacitor. In an embodiment, the combination of the capacitor substrate and the capacitor electrode as seen, e.g., in FIGS. 8 and 9 in cross-section, is in a thickness range from about 0.5 micron (µm) to about 100 µm. In an embodiment, the combination of the capacitor substrate and the capacitor electrode is in a thickness range from about 1 µm to about 6 µm. In an embodiment, the combination of the capacitor substrate and the capacitor electrode is about 3 µm thick.

In an embodiment, a plurality of capacitor layer assemblies is laminated to form a parallel-plate capacitor, in a layer range from about 2 assemblies to about 10,000 assemblies. In an embodiment, a plurality of capacitor layer assemblies is laminated to form a parallel-plate capacitor, in a layer range from about 100 assemblies to about 8,000 assemblies. In an embodiment, a plurality of capacitor layer assemblies is laminated to form a parallel-plate capacitor, in a layer range from about 1,000 assemblies to about 5,000 assemblies.

The process includes lamination of a plurality of capacitor layer assemblies, pressing, and firing the assemblies to cure the dielectric substrate, to drive the binder materials out of the capacitor body, and to bond the entire assembly into an integral unit.

Figure 11:
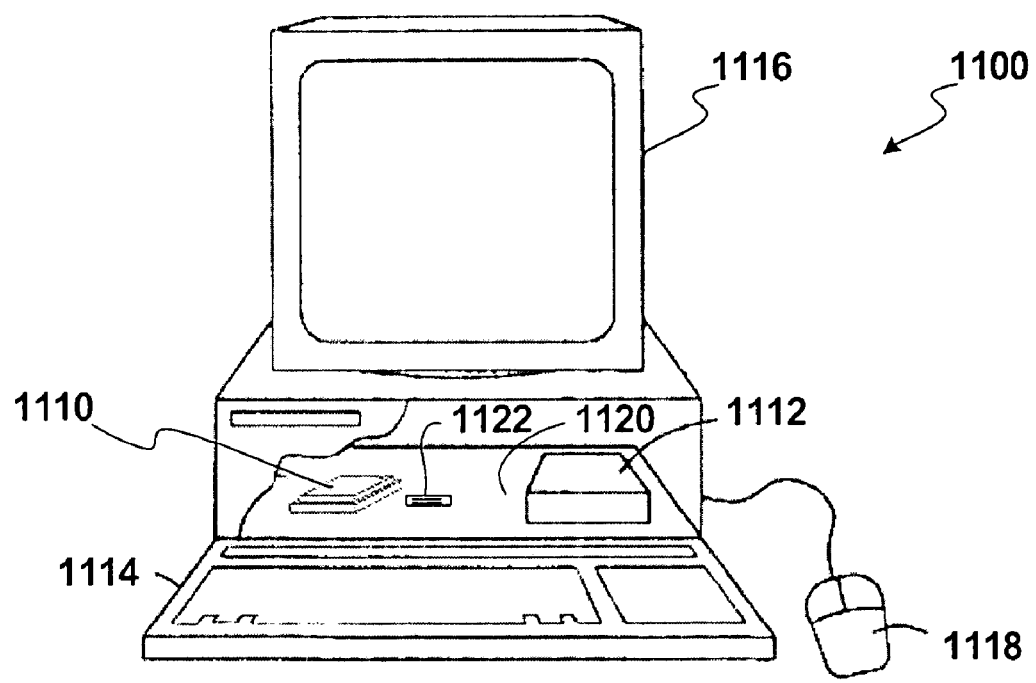
FIG. 11 is a depiction of a computing system according to an embodiment.

FIG. 11 is a depiction of a computing system according to an embodiment.

One or more of the foregoing embodiments of a capacitor layer assembly may be utilized in a computing system, such as computing system 1100 of FIG. 11. The computing system 1100 includes at least one processor (not pictured), which is enclosed in a package 1110, and a data storage system 1112 for example, for a data storage device such as dynamic random access memory, polymer memory, flash memory, and phase-change memory. The computing system 1100 also includes at least one input device such as a keyboard 1114, and at least one output device such as a monitor 1116, for example. The computing system 1100 includes a processor that processes data signals, and may include, for example, a microprocessor, available from Intel Corporation. In addition to the keyboard 1114, the computing system 1100 can include another user input device such as a mouse 1118, for example.

For purposes of this disclosure, a computing system 1100 embodying components in accordance with the claimed subject matter may include any system that utilizes a capacitor layer assembly 1122, which may be coupled to a mounting substrate 1120. The capacitor layer assembly 1122 can also be coupled to the mounting substrate 1120 for a die that contains a digital signal processor (DSP), a micro-controller, an application specific integrated circuit (ASIC), or a microprocessor.

Embodiments set forth in this disclosure can be applied to devices and apparatuses other than a traditional computer. For example, a die can be packaged with an embodiment of the capacitor layer assembly and placed in a portable device such as a wireless communicator, or a hand-held device such as a personal digital assistant and the like. Another example is a die that can be packaged with a capacitor layer assembly and placed in a vehicle such as an automobile, a locomotive, a watercraft, an aircraft, or a spacecraft.

The Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a-single disclosed embodiment. Thus the following claims are hereby incorporated into the Detailed Description, with each claim standing on its own as a separate preferred embodiment.

It will be readily understood to those skilled in the art that various other changes in the details, material, and arrangements of the parts and method stages which have been described and illustrated in order to explain the nature of this invention may be made without departing from the principles and scope of the invention as expressed in the subjoined claims.

What is claimed is:

1. An article comprising:
   a capacitor electrode including a first effective series resistance; and
   an electrode tab appended to the capacitor electrode and including a second effective series resistance, wherein the second effective series resistance is greater than the first effective series resistance.

2. The article of claim 1, wherein the electrode tab includes an opening therein.

3. The article of claim 1, wherein the electrode tab includes an opening therein, and wherein the opening describes a shape in the electrode tab, selected from curvilinear, rectilinear, a channel opening, and combinations thereof.

4. The article of claim 1, wherein the electrode tab includes a virtual opening therein, and wherein the virtual opening is achieved by a dielectric particle disposed within the electrode tab.

5. The article of claim 1, wherein the electrode tab includes a virtual opening therein, and wherein the virtual opening is achieved by a dispersion of dielectric particles disposed within the electrode tab.

6. The article of claim 1, wherein the capacitor electrode includes a first metal or metal alloy, and wherein the electrode tab includes a second metal or metal alloy.

7. The article of claim 1, wherein the capacitor electrode includes an electrode tab edge, and wherein the capacitor electrode includes an undercut in the electrode tab edge.

8. The article of claim 1, wherein the capacitor electrode includes a first metal or metal alloy, wherein the electrode tab includes a second metal or metal alloy, wherein the capacitor electrode includes an electrode tab edge, and wherein the capacitor electrode includes an undercut in the electrode tab edge.

9. The article of claim 1, wherein the capacitor electrode includes a first thickness, wherein the electrode tab includes a second thickness, and wherein the second thickness is less than the first thickness.

10. A process comprising:
    forming a capacitor electrode including a first effective series resistance; and
    forming an electrode tab including a second effective series resistance, wherein the second effective series resistance is greater than the first effective series resistance.

11. The process of claim 10, wherein forming the electrode tab includes forming a structure therein selected from an opening, a virtual opening, and a combination thereof.

12. The process of claim 10, wherein the process includes forming the capacitor electrode from a first metal or first alloy, and forming the electrode tab from a second metal or second alloy.

13. The process of claim 10, wherein the process includes forming the electrode tab with a dielectric particle disposed therein.

14. The process of claim 10, wherein forming the electrode tab includes:
    forming a first part to contact the capacitor electrode; and
    forming a second part to contact the first part.

15. The process of claim 10, wherein the capacitor electrode includes an electrode tab edge, and wherein forming the capacitor electrode includes forming an undercut in the electrode tab edge thereof.

16. The process of claim 10, wherein the process includes forming the capacitor electrode from a first metal or first alloy, and forming the electrode tab from a second metal or second alloy, wherein the capacitor electrode includes an electrode tab edge, and wherein forming the capacitor electrode includes forming an undercut in the electrode tab edge thereof.

17. The process of claim 10, wherein forming the capacitor electrode includes forming a first thickness, wherein forming the electrode tab includes forming a second thickness, and wherein the second thickness is less than the first thickness.

18. The process of claim 10, wherein the process includes forming the capacitor electrode from a first metal or first alloy, and forming the electrode tab from a second metal or second alloy, wherein the capacitor electrode includes an electrode tab edge, wherein forming the capacitor electrode includes forming an undercut in the electrode tab edge thereof, wherein forming the capacitor electrode includes a forming a first thickness, wherein forming the electrode tab includes forming a second thickness, and wherein the second thickness is less than the first thickness.

19. A computing system comprising:
  a capacitor electrode including a first effective series resistance;
  an electrode tab appended to the capacitor electrode and including a second effective series resistance, wherein the second effective series resistance is greater than the first effective series resistance;
  a die coupled to the capacitor electrode; and
  dynamic random access storage coupled to the die.

20. The computing system of claim 19, wherein the die is an IC die.

21. The computing system of claim 19, wherein the system is disposed in one of a computer, a wireless communicator, a hand-held device, an automobile, a locomotive, an aircraft, a watercraft, and a spacecraft.

22. The computing system of claim 19, wherein the die is selected from a data storage device, a digital signal processor, a micro controller, an application specific integrated circuit, and a microprocessor.

* * * * *